(12) United States Patent  (10) Patent No.: US 7,839,497 B1
Rausch et al. (45) Date of Patent: Nov. 23, 2010

(54) PHASE COMPENSATOR FOR COUPLING AN ELECTROMAGNETIC WAVE INTO AN OPTICAL CONDENSER

(75) Inventors: Tim Rausch, Gibsonia, PA (US); Michael A. Seigler, Pittsburgh, PA (US); Edward C. Gage, Mars, PA (US); William A. Challener, Sewickley, PA (US); Robert E. Rottmayer, Wexford, PA (US); Chubing Peng, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1165 days.

(21) Appl. No.: 11/485,737

(22) Filed: Jul. 13, 2006

(51) Int. Cl.
*G02B 27/32* (2006.01)

(52) U.S. Cl. .......... 356/256; 356/237.1; 356/237.6; 369/112.09; 369/118; 369/300

(58) Field of Classification Search ............ 369/13.33, 369/112.07–112.09, 112.2, 112.21, 118, 369/300; 356/237.1–237.6, 256
See application file for complete search history.

(56) References Cited

U.S. PATENT DOCUMENTS

| 5,805,540 | A  | * | 9/1998 | Kitai et al. ............... 369/53.29 |
| 6,360,035 | B1 | * | 3/2002 | Hurst et al. ............... 385/18 |
| 2004/0001394 | A1 |   | 1/2004 | Challener et al. |
| 2004/0001420 | A1 |   | 1/2004 | Challener |
| 2004/0062503 | A1 |   | 4/2004 | Challener |
| 2005/0135008 | A1 | * | 6/2005 | Challener et al. ......... 360/128 |

* cited by examiner

*Primary Examiner*—Gregory J Toatley
*Assistant Examiner*—Iyabo S Alli
(74) *Attorney, Agent, or Firm*—Benjamin T. Queen, II; Pietragallo Gordon Alfano Bosick & Raspanti, LLP (57) ABSTRACT

An apparatus comprising a phase compensator and an optical condenser in communication with the phase compensator. The phase compensator provides for phase shifting a portion of an electromagnetic wave. The optical condenser is shaped to direct the electromagnetic wave to a focal region of the optical condenser.

11 Claims, 7 Drawing Sheets

PHASE COMPENSATOR FOR COUPLING AN ELECTROMAGNETIC WAVE INTO AN OPTICAL CONDENSER

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

The invention relates to a system for confined optical power delivery and enhanced optical transmission efficiency.

BACKGROUND INFORMATION

In an effort to increase areal density of magnetic storage media, it is desirable to reduce the volume of magnetic material used to store bits of information in magnetic storage media. Superparamagnetic instabilities become an issue as the grain volume is reduced. The superparamagnetic effect is most evident when the grain volume V is sufficiently small that the inequality $K_u V/k_B T > 70$ can no longer be maintained. $K_u$ is the material's magnetic anisotropy energy density, $k_B$ is Boltzmann's constant, and T is the absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

The thermal stability can be improved by employing a recording medium made of a material with a very high $K_u$. However, with the available materials current recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

For heat assisted magnetic recording, an electromagnetic wave of, for example, visible, infrared or ultraviolet light can be directed onto a surface of a data storage medium to raise the temperature of the localized area of the medium to facilitate switching of the magnetization of the area. Well-known solid immersion lenses (SILs) have been proposed for use in reducing the size of a spot on the medium that is subjected to the electromagnetic radiation. In addition, solid immersion mirrors (SIMS) have been proposed to reduce the spot size. SILs and SIMs may be either three-dimensional or two-dimensional. In the latter case they correspond to mode index lenses or mirrors in planar waveguides. A metal pin can be inserted at the focus of a SIM to guide a confined beam of light out of the SIM to the surface of the recording medium. Commonly assigned U.S. Pat. No. 6,795,630, which is hereby incorporated by reference, discloses several waveguides having a metallic pin transducer for concentrating optical energy into a small spot.

Data storage systems often incorporate optical components to assist in the recording of information. Such systems may include, for example, optical recording systems, magneto-optical recording systems or other thermal or heat assisted type recording systems, as described herein. An important aspect of such systems utilizing optical components may include the ability to generate small and intense optical spots of energy. The optical spots can be used for various functions in the recording process, such as aiding in the reading or writing of bits of information.

Prior to generating the small and intense optical spots of energy, it is usually necessary to couple an electromagnetic wave from an energy source into a desired optical condenser, such as a waveguide. One known structure for coupling the electromagnetic wave into the optical condenser is a diffraction grating. Diffraction gratings are generally known components in an optical system that mutually enhance the effects of diffraction to concentrate the diffracted electromagnetic wave in specific directions determined by the spacing of the lines and by the wavelength of the electromagnetic wave.

There is an increased emphasis on improving the areal densities of data storage systems. Thus, all components of a data storage system are being improved to achieve higher areal densities. For example, those systems that incorporate optical components to assist in the recording of information are in need of the ability to efficiently generate even smaller and more intense optical spots of energy to support the data storage systems of the future.

Accordingly, there is identified a need for improved devices that overcome limitations, disadvantages, and/or shortcomings of known devices for coupling electromagnetic waves and generating smaller and intense optical spots of energy.

SUMMARY OF THE INVENTION

The invention meets the identified need, as well as other needs, as will be more fully understood following a review of this specification and drawings.

An aspect of the present invention is to provide an apparatus including a phase compensator and an optical condenser in communication with the phase compensator. The phase compensator provides for phase shifting a portion of an electromagnetic wave. The optical condenser is shaped to direct an electromagnetic wave to a focal region of the optical condenser.

Another aspect of the invention is to provide an apparatus that includes a phase compensator including a first section having a first wave propagation characteristic and a second section having a second wave propagation characteristic. The apparatus also includes an optical condenser in communication with the phase compensator.

Another aspect of the invention is to provide an apparatus that includes a phase compensator and a planar waveguide in optical communication with the phase compensator.

These and other aspects of the present invention will be more apparent from the following description.

BRIEF DESCRIPTION OF THE DRAWINGS

FIG. 8b is a graphical illustration of intensity versus time for a wave passing through the phase compensator illustrated in FIG. 8a.

FIG. 8c is a graphical illustration of signal versus time for a wave passing through the phase compensator illustrated in FIG. 8a.

DETAILED DESCRIPTION

This invention encompasses devices that can be used to produce small optical spots and that can be used in magnetic and/or optical recording heads for use with magnetic and/or optical recording media. However, it will be appreciated that the invention may have utility in other technologies such as, for example, high resolution optical microscopy, lithography, integrated opto-electronic devices for telecommunications or other applications.

Figure 1:
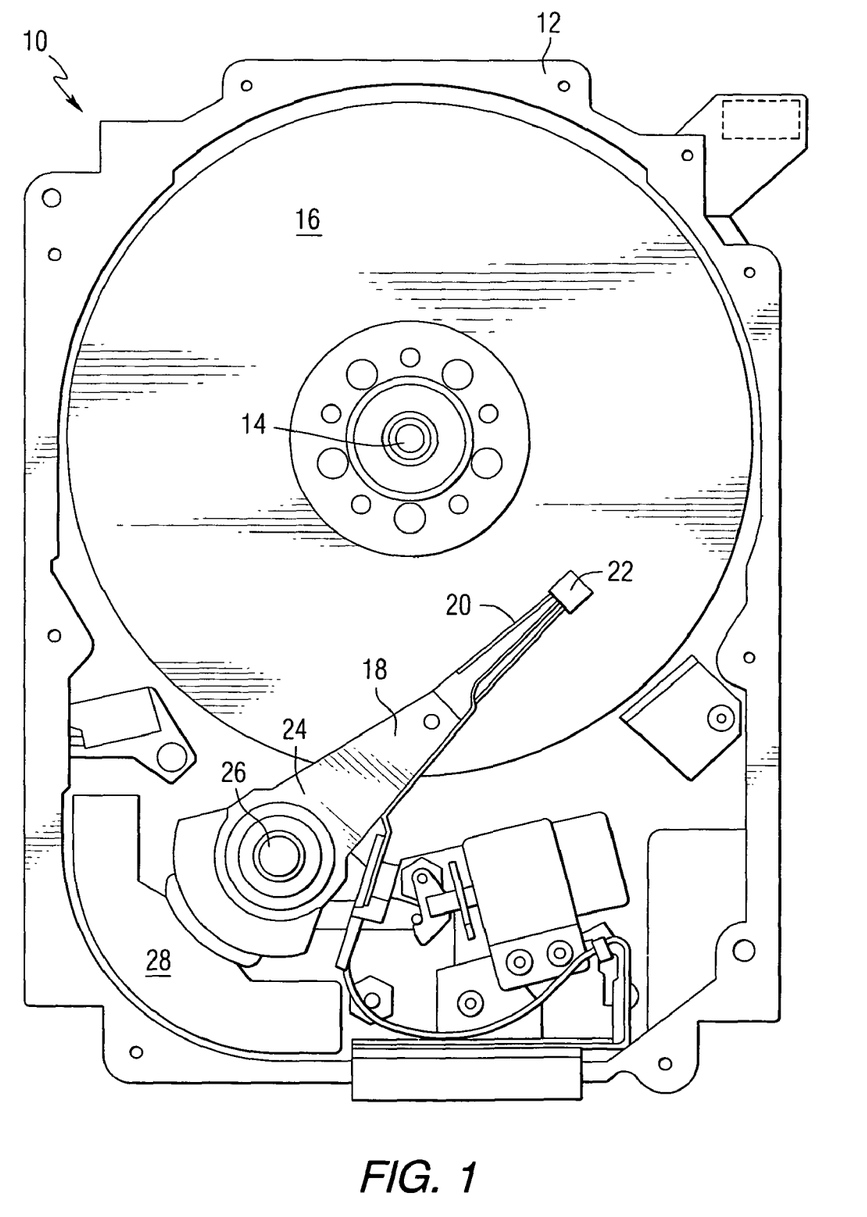
FIG. 1 is a pictorial representation of a magnetic disc drive that can include magnetic heads constructed in accordance with this invention.

Referring to the drawings, FIG. 1 is a pictorial representation of a disc drive 10 that can utilize magnetic recording heads, or other type recording heads such as magneto-optical or thermal/heat assisted recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figures 2, 3, 4:
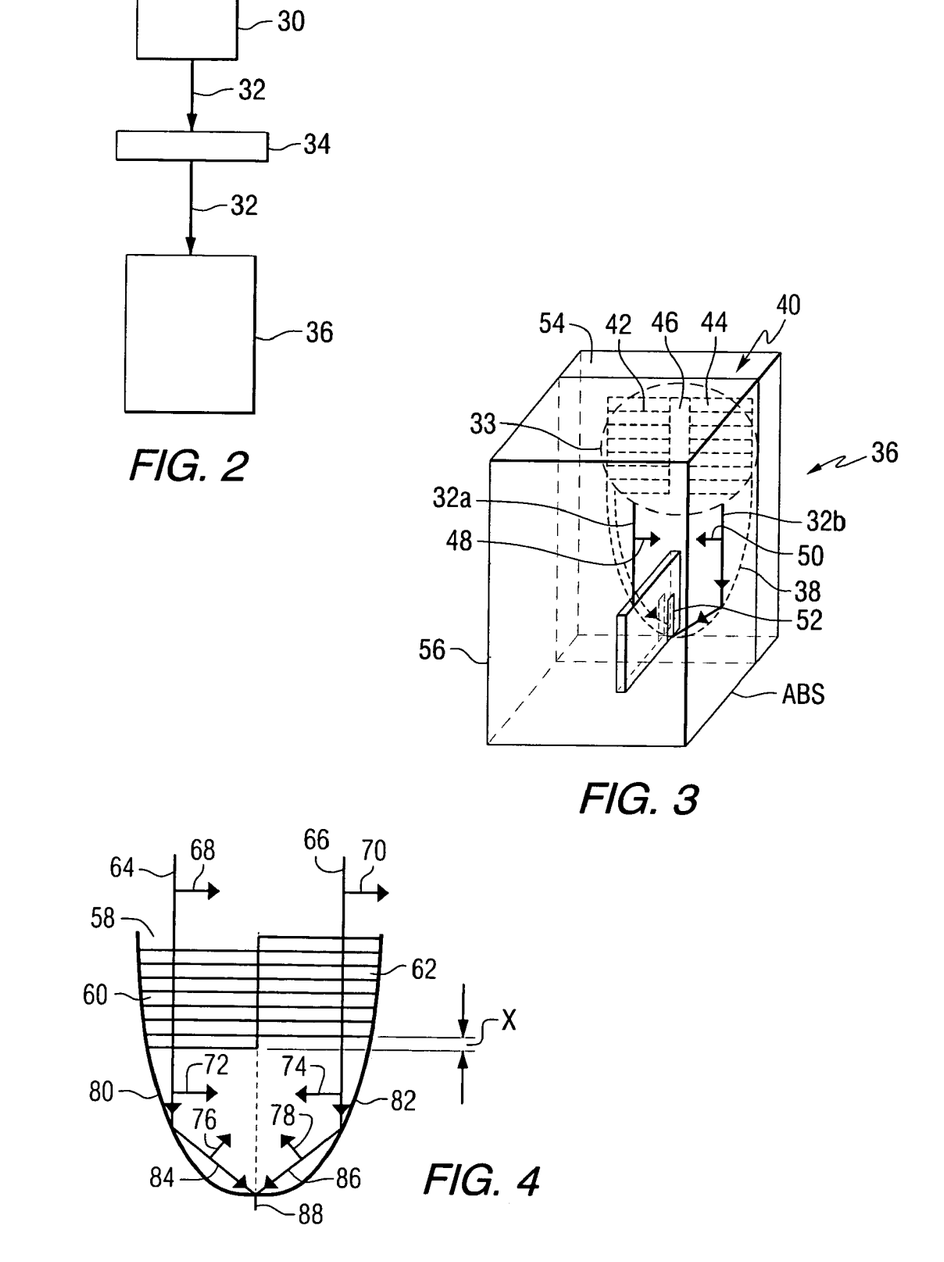
FIG. 2 is a schematic representation of an apparatus constructed in accordance with the invention.
FIG. 3 is an isometric view of an optical condenser.
FIG. 4 illustrates a planar waveguide in accordance with an aspect of the invention.

FIG. 2 schematically illustrates a structure for heating a magnetic recording medium 16 approximate to where the recording head 22 applies a magnetic write field to the recording medium 16 (FIG. 1) in, for example, a heat assisted magnetic recording (HAMR) system. A light source 30 which may be, for example, a laser diode or other suitable laser light source, is used for generating an electromagnetic wave, as represented by arrow 32. The electromagnetic wave 32 passes through an optical component 34 which in turn directs the electromagnetic wave 32 toward an optical condenser 36. The optical component 34 may include at least one of, for example, an optical flat, an optical fiber, a laser diode, a lens, a mirror, or a half wave plate. In accordance with an aspect of the invention, a phase compensator for phase shifting a portion of the electromagnetic wave 32 may be positioned along the optical path of the electromagnetic wave 32. In addition, additional structure for phase shifting the electromagnetic wave may or may not be included within the optical condenser 36, as will be described in more detail herein.

FIG. 3 illustrates a more detailed view of the optical condenser 36. Specifically, the optical condenser 36 may include a planar waveguide 38 which may be, for example, in the form of a solid immersion mirror (SIM) or a parabolic mirror. The waveguide 38 may have a near field transducer 52 such as, for example, a metallic pin adjacent to an end near the air-bearing surface (ABS) of the recording head 22. The waveguide 38 includes a dual input grating coupler, generally represented by arrow 40 that is comprised of gratings 42 and 44 separated by a gap 46. A focus spot or laser spot 33 generated by electromagnetic wave 32 is directed onto the gratings 42 and 44 and coupled to the waveguide 38 by the gratings to produce the electromagnetic waves within the waveguide 38, as illustrated by arrows 32a and 32b. The electromagnetic waves 32a and 32b are illustrated as phase shifted by 180° with respect to the wave illustrated by arrow 32a. Arrows 48 and 50 illustrate the instantaneous electric field of the waves. The waves are reflected off of the parabolic sides of the waveguide 38 and the electric field components of the reflected waves add in the vertical direction at the transducer 52 so that the transducer 52 concentrates the electromagnetic waves near the ABS of the recording head 22 to heat a portion of the magnetic storage medium 16. The waveguide 38 is shown to be embedded, for example, in a cladding layer 54 and mounted on a slider 56.

As described herein, the optical condenser 36 can provide for phase shifting a portion of the electromagnetic wave 32. For example, FIG. 4 makes use of a diffraction grating arrangement for providing the phase shifting. Specifically, FIG. 4 illustrates a two dimensional planar waveguide 58 in the form of, for example, a SIM and including first and second diffraction gratings 60 and 62. Diffraction gratings are commonly used to inject light into a planar waveguide. To generate split linear polarization, the two diffraction gratings 60 and 62 are used with a longitudinal offset X between them as illustrated. The purpose of the dual grating is to introduce a relative phase shift of about 180° between the two halves of the light beam. Arrows 64 and 66 illustrate an incident electromagnetic wave having an electric field represented by arrows 68 and 70, respectively, and a transverse electric waveguide mode having an electric field represented by arrows 72, 74, 76 and 78. As shown by arrows 68 and 70, the electric field of the incident wave is initially linearly polarized in the plane of the waveguide for TE modes. Grating 60 is used to launch the wave into half of the waveguide 58. Grating 62 is used to launch the wave into the other half of the waveguide 58. The longitudinal offset and the position of the two gratings causes a 180° phase shift to occur between the two waveguide modes as shown by arrows 72 and 74. After reflection from the edges 80 and 82 of the waveguide 58, the reflected waves as illustrated by arrows 84 and 86 have electric fields that include both longitudinal and transverse components in the case of a TE polarization. When the reflected waves meet at the focal point, the transverse components of the fields cancel and the longitudinal components of the electric fields add. This excites surface plasmons on the near field transducer 88, which may be, for example, a metallic pin.

In contrast to providing for phase shifting the electromagnetic wave within the optical condenser 36, such as providing the offset gratings 60 and 62 as described herein and illustrated in FIG. 4, an aspect of the invention includes providing for the phase shifting of the electromagnetic wave to occur prior to the electromagnetic wave reaching the diffraction gratings. It will be appreciated that in accordance with the invention, phase shifting may occur prior to the electromagnetic wave reaching the diffraction gratings and/or phase shifting may occur once the electromagnetic wave reaches the diffraction gratings as well.

Figure 5:
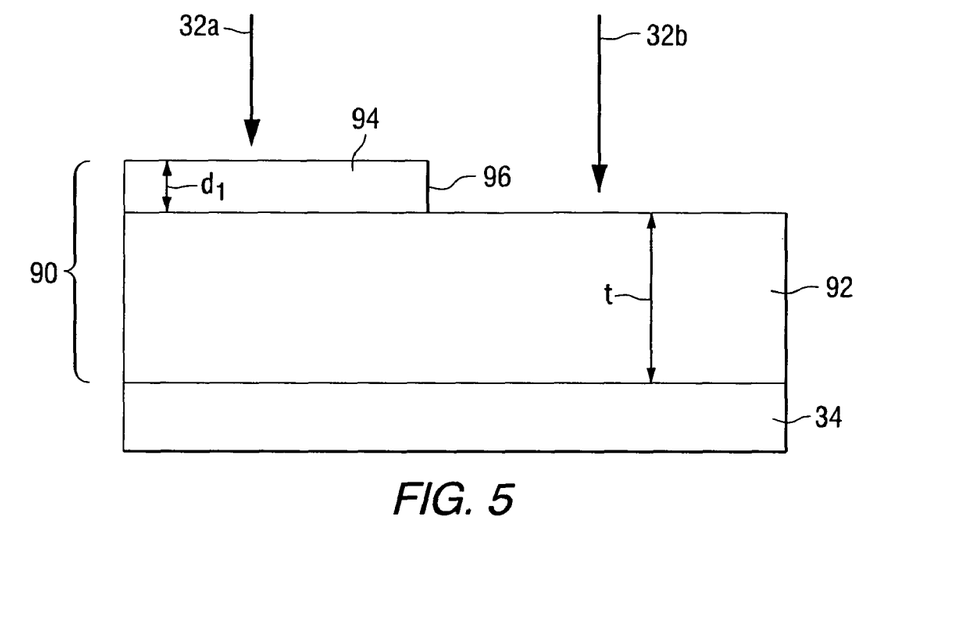
FIG. 5 illustrates an embodiment of a phase compensator in accordance with the invention.

FIG. 5 illustrates an embodiment of the invention for phase shifting the electromagnetic wave 32. Specifically, FIG. 5 illustrates a phase compensator 90 which in this embodiment includes an optical flat 92 with a thickness t and a refractive index $n_f$ and having a thin film 94 with a thickness $d_1$ and a refractive index $n_d$ deposited on the optical flat 92. As used herein, "optical flat" generally refers to an optical component formed of a transparent material and having opposing surfaces wherein each surface has a flatness less than about one-tenth the wavelength of an electromagnetic wave that would propagate or pass through the optical flat. The film 94 provides a split line 96 for the optical flat 92 such that a portion of the electromagnetic wave 32a that passes through the film 94 and the optical flat 92 on one side of the split line 96 is phase shifted relative to the remaining portion of the electromagnetic wave 32b that passes only through the optical flat 92 on the other side of the split line 96. Thus, it will be appreciated that the split line 96 acts as a dividing line for determining which portion of the wave 32 is phase shifted and which portion of the wave 32 is not phase shifted. The thicknesses and material choices for the optical flat 92 and the film 94 are selected to provide the desired amount of phase shifting, which in one embodiment of the invention is about 180°. To generate split linear light, the optical path difference between the part of the electromagnetic wave 32a that passes through both the film 94 and the optical flat 92 and the part of the electromagnetic wave 32b that passes just through the optical flat 92 must satisfy the following equation:

$$\frac{(2m+1)\lambda}{2} = (n_d - 1)d_1 \quad \text{(Equation 1)}$$

In this equation, m is an integer $\leqq 0$ and $\lambda$ equals the wavelength of the electromagnetic wave 32.

Figure 6:
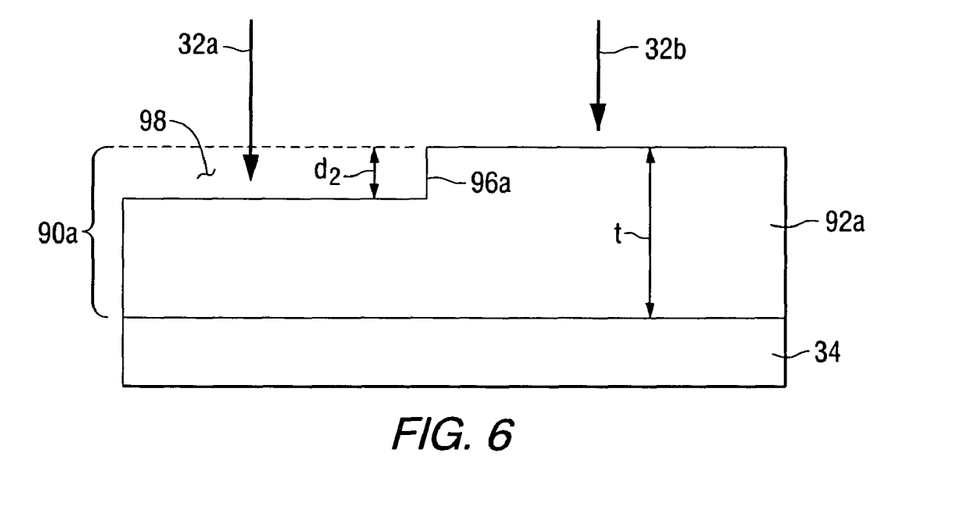
FIG. 6 illustrates an additional embodiment of a phase compensator in accordance with the invention.

FIG. 6 illustrates another embodiment of the invention that includes a phase compensator 90a which comprises an optical flat 92a having a thickness t and a refractive index of and a portion of the optical flat that is etched to create a void, generally represented by arrow 98 wherein the void has a depth or thickness illustrated by arrow $d_2$. Once the electromagnetic wave 32 passes through the phase compensator 90a, then one side of the beam 32a will be phase shifted relative to the beam 32b due to the void 98. The void 98 further defines the split line 96a for determining how much of the electromagnetic wave will be phase shifted. The amount of material that must be removed to form the void 98 must satisfy the following relationship:

$$\frac{(2m+1)\lambda}{2} = (n_f - 1)d_2 \quad \text{(Equation 2)}$$

As illustrated in FIGS. 5 and 6, the phase compensators 90 and 90a may be integrally combined with, for example, the optical component 34, or the phase compensators 90 and 90a may be formed separate from or without the optical component 34. The phase compensator 90 or 90a, or other phase compensators constructed in accordance with the invention, may be advantageously positioned at any point along the optical path from the light source 30 to the optical component 34 to the optical condenser 36 as long as the placement of the phase compensator allows for phase shifting of the electromagnetic wave prior to the electromagnetic wave 32 being coupled into the optical condenser 36.

The optical flat 92 and 92a illustrated in FIGS. 5 and 6, respectively, may be formed of glass or any other common transparent material. In addition, the optical flat 92 and 92a thicknesses t may be in the range of about 0.1 mm to about 1 cm. Furthermore, the film 94 may be formed of silicon nitride, aluminum oxide or any other transparent film. In addition, the film 94 may have a thickness $d_1$ in the range of about 100 nm to about 1000 nm. The void 98 illustrated in FIG. 6 may have a depth or thickness $d_2$ in the range of about 350 nm to about 1000 nm.

The phase compensators 90 and 90a may be positioned anywhere along the optical path from the light source 30 to the optical component 34 to the optical condenser 36, such as placing the phase compensator 90 or 90a on the slider 56 portion thereof. The phase compensators 90 and 90a need to be generally centered on the wave 32 (made up of 32a and 32b) so that the wave intersects the respective split lines 96 and 96a, i.e., in one embodiment preferably about half of the wave 32 is phase shifted and about half of the wave 32 is not phase shifted.

Figure 7A:
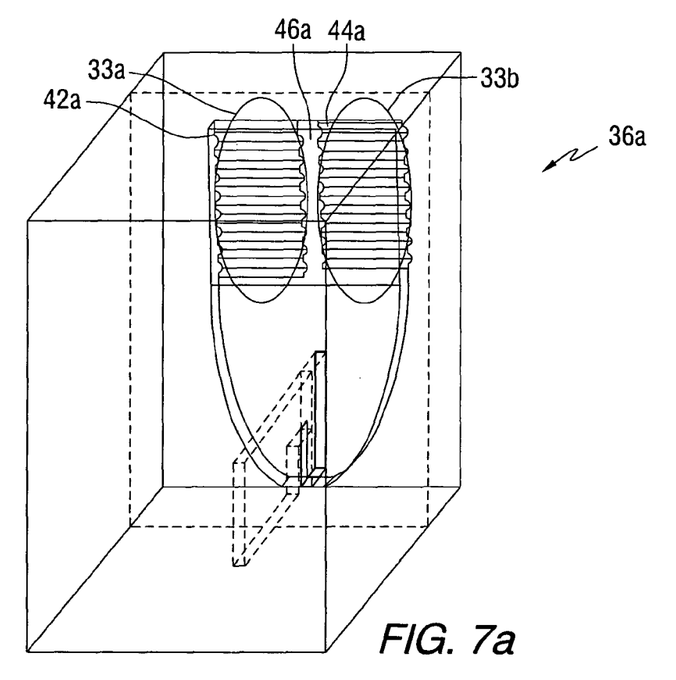
FIG. 7a is an embodiment of an optical condenser in accordance with the invention.
Figure 7B:
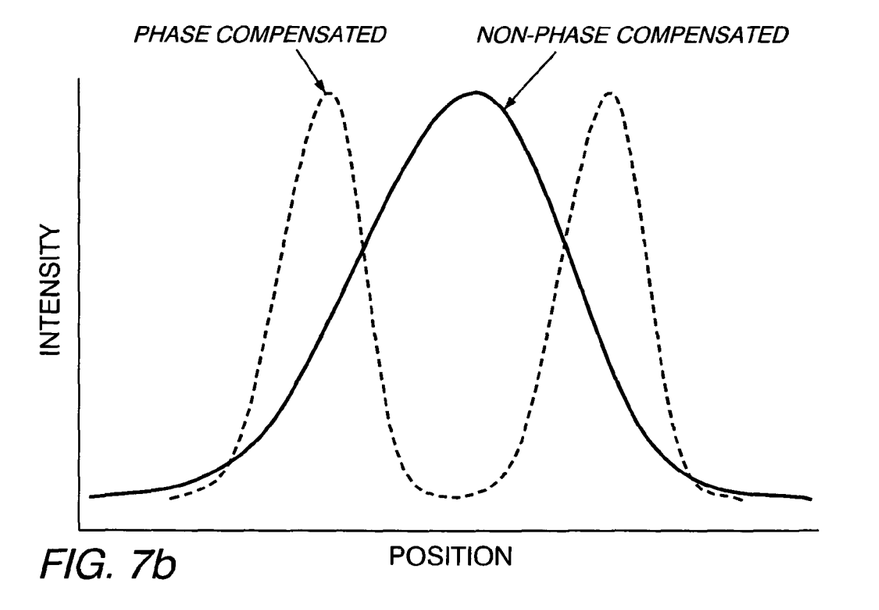
FIG. 7b is a graphical illustration of intensity versus position for a phase compensated wave in contrast to a non-phase compensated wave.

Electromagnetic modeling of the electromagnetic waves 32a and 32b that pass through the phase compensator 90, as illustrated in FIG. 5 indicate that the focus spot will have two maxima with one maxima phase shifted relative to the other. This is illustrated in FIGS. 7a and 7b. Specifically, FIG. 7a illustrates an optical condenser 36a that is similar to the optical condenser 36 illustrated in FIG. 3 and described herein except that as described the phase shifting of the electromagnetic wave occurs prior to the wave reaching the condenser 36a and results in focus spots 33a and 33b on the gratings 42a and 44a. FIG. 7b illustrates the intensity versus position across the width of the gratings for the phase compensated wave (shown in dotted line) as opposed to the non-phase compensated wave that is incident upon the gratings without any prior phase shifting (shown in solid line). It will be apparent that one advantage of the invention is that due to the gap 46a being formed between the gratings 42a and 44a, the portion of the electromagnetic wave in the center portion of the structure that would otherwise not be coupled into the waveguide is now being efficiently coupled into the gratings 42a and 44a as a result of the focus spots 33a and 33b and the intensity profile as illustrated. This results in the efficient coupling of the electromagnetic wave into the optical condenser 36a in order that a smaller and a more intense optical spot may be generated.

Figure 8A:
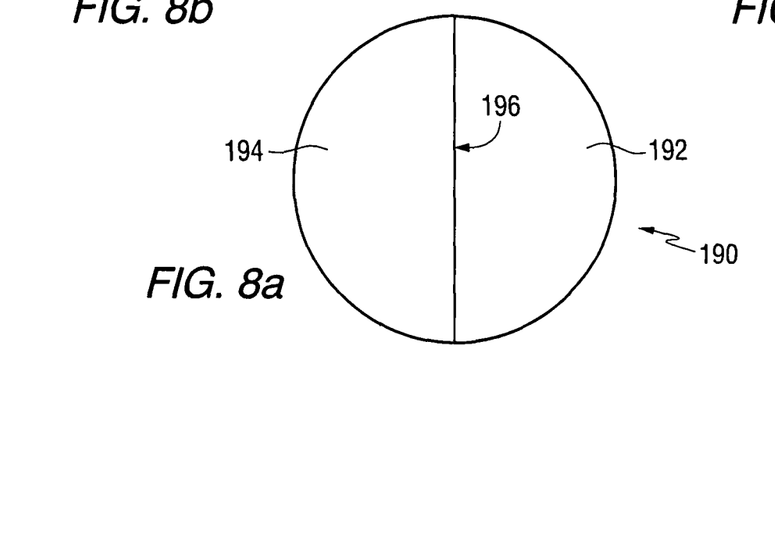
FIG. 8a illustrates an embodiment of a phase compensator constructed in accordance with the invention.
Figure 8B:
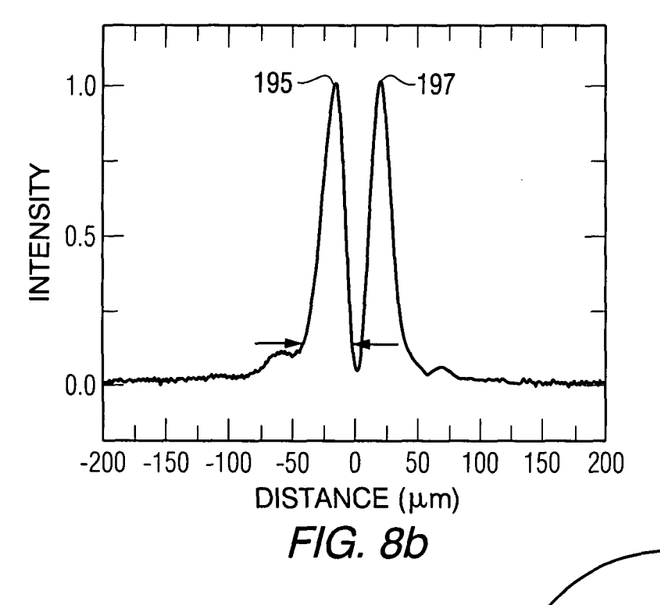
Figure 8C:
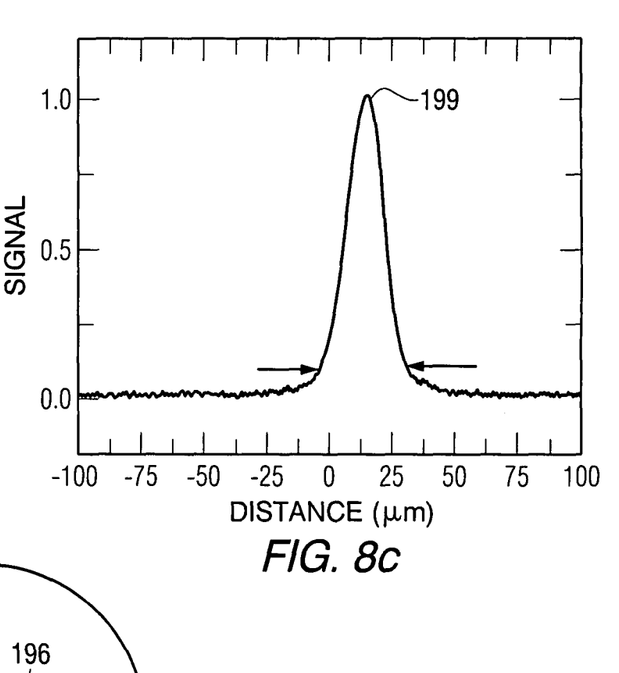

FIG. 8a illustrates a phase compensator 190 constructed in accordance with the invention. Specifically, the phase compensator 190 was fabricated using electron beam evaporation of, for example, a thin film 194 of alumina onto an optical flat 192. A shadow mask was used so that the thin film 194 of alumina was only deposited on one-half of the optical flat 192. The phase compensator 190 was fabricated for a wavelength of 830 nm, so the target thickness was 638 nm [(830 nm)/2/(1.65−1)]. In the direction perpendicular to the split line 196, the focused spot has two maxima 195 and 197 (see FIG. 8b) while in the direction parallel to the split line 196, there is one maximum 199 (see FIG. 8c). An advantage to using this technique is that the two maxima 195 and 197 are better suited for coupling light into the waveguide since no energy is lost in the gap between the gratings. It will be appreciated that the thin film coating should not be limited to optical flats only and can be deposited, for example, on the end of an optical fiber, on the facet of a laser diode, on a focusing lens or on a slider.

Although any transparent dielectric material can be used for the thin film that is deposited, for example, on an optical flat as described herein, ideally the dielectric materials are made of the same material as the optical flat. If this is done, then the reflection losses from the dielectric/air interface will be the same as at the optical flat/air interface for the remainder of the optical flat and there will be no reflection losses at the dielectric/optical flat interface thereby maintaining equal amplitudes for the transmitted electric fields which correspond to the best interference between the two beams and the focal plane in the lowest minimum at the center of the spot. Furthermore, a dielectric anti-reflection coating may be applied uniformly over the phase compensator 90, 90a or 190.

Figure 9:
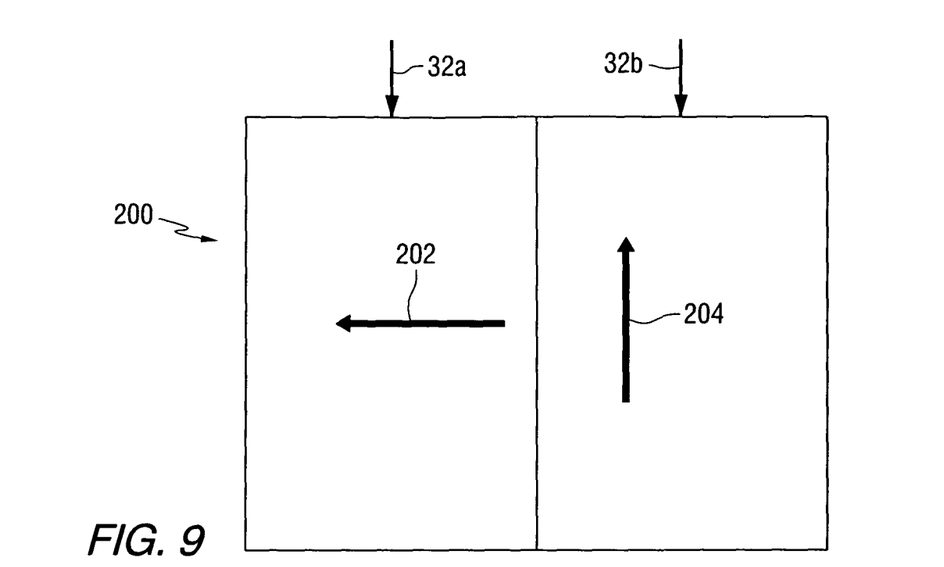
FIG. 9 illustrates an additional embodiment of a phase compensator constructed in accordance with the invention.

FIG. 9 illustrates an additional embodiment of a phase compensator 200 constructed in accordance with the invention. In this embodiment, the phase compensator 200 includes a half wave plate. In an optical wave plate, there is a fast and slow axis and they are designed so that a beam traveling on the fast axis will be shifted by a half wavelength relative to the slow axis. To adjust the phase of the incident beam, a half wave plate is cut in half and assembled together as shown in FIG. 9. It should be noted that two separate half wave plates cannot be used because they will not have the same total optical path link along their fast or slow axes. The arrows 202 and 204 refer to the fast axis of the film once assembled. The slow axes are at a right angle to the fast axes. A beam of light or wave 32b passing through the phase compensator 200 is polarized along the fast axis 204 while the other half of the beam or wave 32a travels along the slow axis that is at a right angle to fast axis 202. By definition a beam traveling on the slow axis experiences a 180 degree phase shift.

It will be appreciated that a phase compensator constructed in accordance with the invention (such as, for example, phase compensator 90 illustrated in FIG. 5, phase compensator 90a illustrated in FIG. 6, and phase compensator 190 illustrated in FIG. 8a) provide for the phase compensator to include a first section or portion having different wave propagation characteristics than a second section or portion of the phase compensator. For example, phase compensator 90 illustrated in FIG. 5 includes a first section that includes the thin film 94 and the optical flat 92 on one side of the split line 96 that provides for the wave 32a to propagate through this section in a different manner than how the wave 32b propagates through the optical flat 92 section. Thus, the differing wave propagation characteristics of the phase compensator 90 allow for the desired phase shifting. Phase compensator 90a includes a first section having the void 98 on one side of the split line 96a which results in different wave propagation characteristics than the second section that only includes the optical flat 92a on the other side of the split line 96a. Also, the phase compensator 190 has different wave propagation characteristics for the optical flat 192 section in comparison to the section on the other side of the split line 196 that includes a thin film 194 deposited on the optical flat 192. Advantageously, by providing a phase compensator having first and second sections or portions that have differing wave propagation characteristics, an incoming wave 32 may be phase shifted as desired depending upon the particular wave propagation characteristics, e.g., refractive index differences, thickness differences, material differences or other optical property differences, that are selected.

Figure 10:
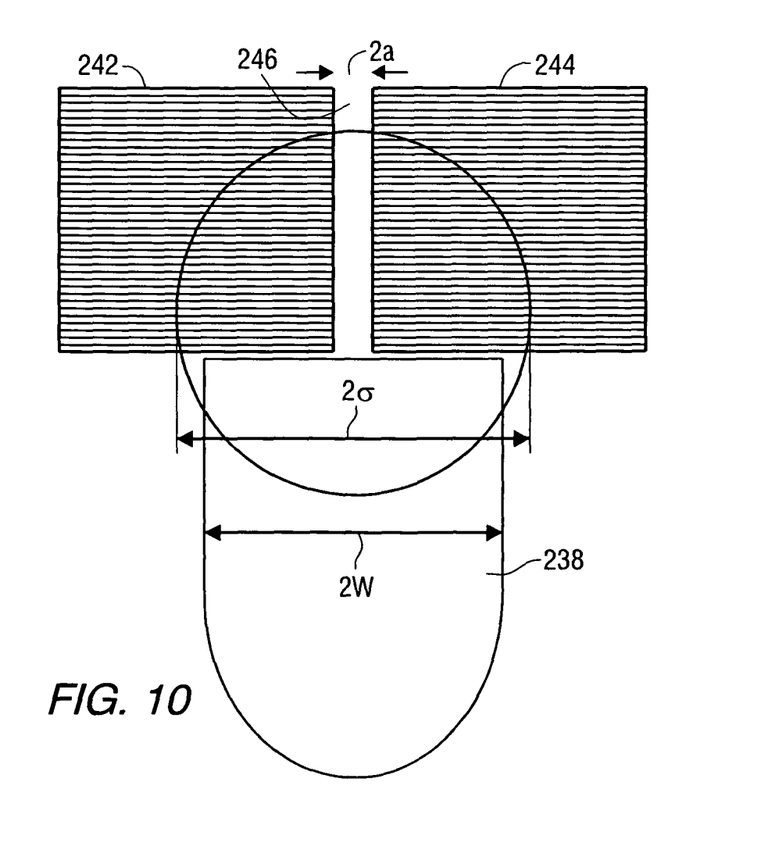
FIG. 10 is a schematic illustration of diffraction gratings and a planar waveguide in accordance with the invention.

The overall coupling efficiency of a device is the product of the grating efficiency and the amount of light that hits the grating. Because of finite size of the grating in the incident spot, not all the light hits the grating and there is an optimal spot size for a given grating. This is referred to as the "filling factor" for the SIM opening. FIG. 10 illustrates this concept wherein there is provided gratings 242 and 244 with a gap 246 therebetween for coupling light into a planar waveguide 238 constructed in the form a SIM. The total power in the cross track direction (i.e., the filling factor) that couples into the waveguide 238 is given by the integral expression as follows:

$$P_{av} = \int_{-W}^{-a} \frac{1}{\sigma\sqrt{2\pi}} e^{-\frac{x^2}{2\sigma^2}} dx + \int_{a}^{W} \frac{1}{\sigma\sqrt{2\pi}} e^{-\frac{x^2}{2\sigma^2}} dx \qquad \text{(Equation 3)}$$
$$= erf\left(\frac{W}{\sqrt{2}\sigma}\right) - erf\left(\frac{a}{\sqrt{2}\sigma}\right)$$

wherein x equals a variable unit of length in the same direction as "a" and "W", erf equals an error function, and the remaining parameters are as illustrated in FIG. 10.

The optimal spot size is given by the following equation:

$$\sigma_{optimal} = \sqrt{\frac{W^2 - a^2}{2\ln\left(\frac{W}{a}\right)}} \qquad \text{(Equation 4)}$$

Figure 11:
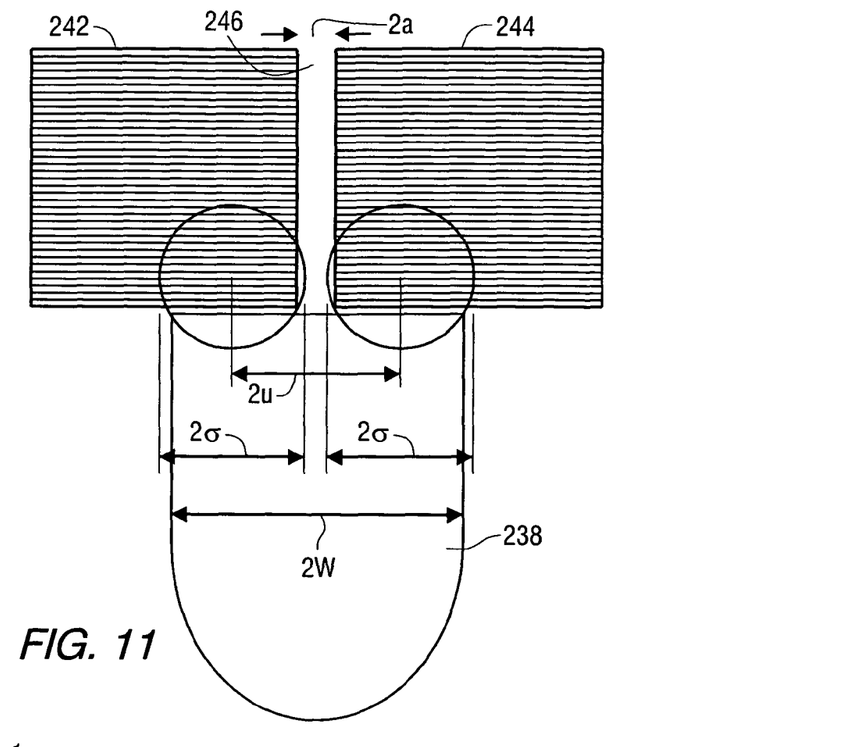
FIG. 11 is a schematic illustration of diffractions gratings and a planar waveguide constructed in accordance with the invention.

FIG. 11 illustrates a similar configuration as set forth in FIG. 10 wherein there is provided gratings 242 and 244 with a gap 246 therebetween for coupling an electromagnetic wave into a planar waveguide 238. In the embodiment illustrated in FIG. 11, the wave that is coupled into the gratings 242 and 244 is provided by, for example, the phase compensator 190 set forth in FIG. 8a having the two maxima separated by a distance 2u as opposed to the single maximum. For this embodiment, the total power in the cross track direction (i.e., the filling factor) that couples into the waveguide 238 is given by the following integral expression:

$$P_{av} = \frac{1}{2}\int_{-W}^{-a} \frac{1}{\sigma\sqrt{2\pi}} e^{-\frac{(x+u)^2}{2\sigma^2}} dx + \frac{1}{2}\int_{a}^{W} \frac{1}{\sigma\sqrt{2\pi}} e^{-\frac{(x-u)^2}{2\sigma^2}} dx \qquad \text{(Equation 5)}$$
$$= \frac{1}{2}erf\left(\frac{W-u}{\sqrt{2}\sigma}\right) - \frac{1}{2}erf\left(\frac{a-u}{\sqrt{2}\sigma}\right)$$

wherein x equals a variable unit of length in the same direction as "a" and "W", erf equals an error function, and the remaining parameters are as illustrated in FIG. 11.

The optimal spot size is provided by the following equation:

$$\sigma_{optimal} = \sqrt{\frac{(W-u)^2 - (a-u)^2}{2\ln\left(\frac{W-u}{a-u}\right)}} \quad \text{(Equation 6)}$$

In one embodiment of the invention set forth in FIG. 11, 2W=50 μm and 2a=6 μm.

Figure 12:
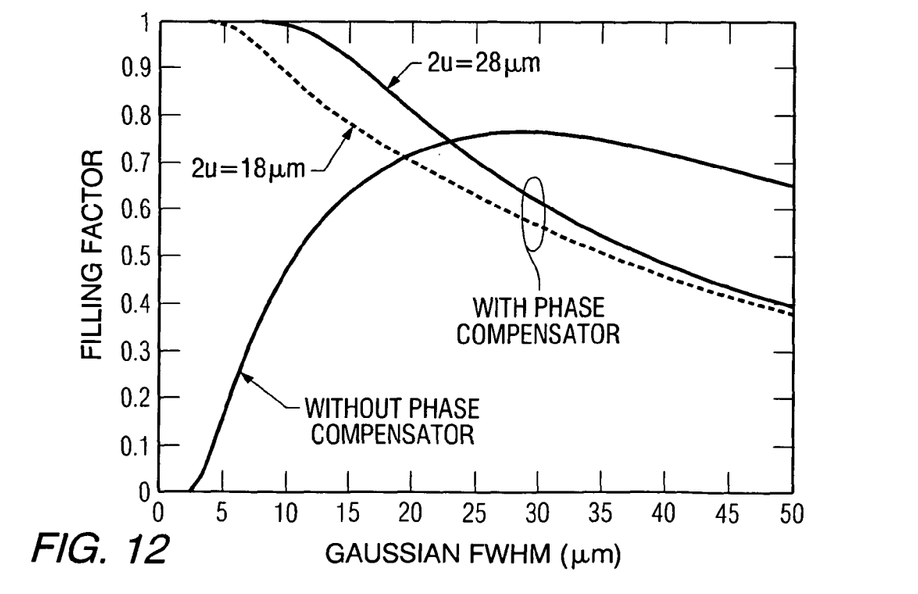
FIG. 12 is a graphical illustration of filling factor versus Gaussian FWHM for an embodiment of the invention having a phase compensator in contrast to an embodiment without a phase compensator.

FIG. 12 illustrates the filling factor for the embodiments set forth in FIG. 10 (without phase compensator) and FIG. 11 (with phase compensator). FIG. 12 clearly illustrates that with the use of a phase compensator one can choose the FWHM of the incident spots and the separation between them in order to achieve a filling factor of about 1.0. This is not possible for coupling with a traditional Gaussian profile which FIG. 12 illustrates a filling factor of approximately 0.75 is achievable.

Although the phase compensator described herein can be used in any coupling application where split linear light is required, it is better suited for a situation where a coupling grating is not used. For example, some of the light delivery options contemplated for heat assisted magnetic recording use an end fire coupling scheme where a phase compensator would be required to generate split linear light. In addition, the phase compensator might be useful in other as yet unforeseen applications where, for example, a prism coupler is used and split linear light is required. This may occur if the solid immersion mirror is ever used, for example, in a microscopy application.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. An apparatus, comprising:
a phase compensator configured to receive an electromagnetic wave which has a first portion and a second portion, wherein the phase compensator includes a first section having a first wave propagation characteristic and a second section having a second wave propagation characteristic, wherein the first portion and the second portion of the electromagnetic wave pass through the first section and the second section, respectively, of the phase compensator so as to provide for phase shifting of either the first portion or the second portion of the electromagnetic wave; and
an optical condenser in communication with said phase compensator, said optical condenser shaped to direct the electromagnetic wave to a focal region of said optical condenser.

2. The apparatus of claim 1, wherein said phase compensator includes a first section with a first thickness and a second section with a second thickness.

3. The apparatus of claim 2, wherein at least a portion of said first section has a refractive index that is different from a refractive index of said second section.

4. The apparatus of claim 1, wherein said phase compensator is integrally combined with an optical component.

5. The apparatus of claim 4, wherein the optical component includes at least one of an optical flat, an optical fiber, a laser diode, a lens, a mirror, a half wave plate or a light source.

6. The apparatus of claim 1, wherein the phase compensator provides for about 180° of phase shifting.

7. The apparatus of claim 1, wherein the optical condenser comprises a first diffraction grating and a second diffraction grating, where the first diffraction grating and the second diffraction grating are offset in a longitudinal direction.

8. The apparatus of claim 1, further comprising a near field transducer positioned adjacent the focal region of the optical condenser.

9. The apparatus of claim 8, wherein the near field transducer is a metallic pin.

10. An apparatus, comprising:
a phase compensator configured to receive an electromagnetic wave which has a first portion and a second portion, wherein the phase compensator includes a first section having a first wave propagation characteristic and a second section having a second wave propagation characteristic, wherein the first portion and the second portion of the electromagnetic wave pass through the first section and the second section, respectively, of the phase compensator so as to provide for phase shifting of either the first portion or the second portion of the electromagnetic wave; and
a planar waveguide in optical communication with said phase compensator.

11. The apparatus of claim 7, wherein the planar waveguide includes a side shaped to direct an electromagnetic wave to a focal region of the planar waveguide.

* * * * *